OR 3,669,521 T 3049 W

June 13, 1972 J. B. TAIT 3,669,521

TIME SENSED STATIC BEAM HOLOGRAPHIC STORAGE SYSTEM

Filed Jan. 4, 1971 2 Sheets-Sheet 1

INVENTOR

JOHN B. TAIT

BY

AGENT

United States Patent Office 3,669,521

Patented June 13, 1972

3,669,521

TIME SENSED STATIC BEAM HOLOGRAPHIC STORAGE SYSTEM

John B. Tait, Vestal, N.Y., assignor to International Business Machines Corporation, Armonk, N.Y.

Filed Jan. 4, 1971, Ser. No. 103,663
Int. Cl. G02b *27/00*
U.S. Cl. 350—3.5 7 Claims

ABSTRACT OF THE DISCLOSURE

A finite segment of coherent light issued by a pulsating light source is utilized to read out images of information patterns from a plurality of holograms. An arrangement of reflecting mirrors provides a reflecting path by virtue of which the light segment passes through each hologram at differentially timed intervals in the time domain to cause different images of said patterns to be read out sequentially from said holograms and onto a plane array (or arrays) of photodetectors disposed in the path of said images. The sensing of information at the sense array provides a light pulse position sensing signal to control automatic gain control in the sense amplifiers. The coincidence of a readout gate signal with differentially timed light pulse position signals causes electrical information pattern signals, corresponding to said information patterns, to be read out at said differentially timed intervals.

BACKGROUND OF THE INVENTION

One of the chief drawbacks with present day large volume random access storage is the relatively slow access time. In spite of tremendous advances in laser technology, the scanlaser is limited to deflection speeds in the megacycle range, while the speed of other optically controlled deflection schemes, although more practical from a cost consideration, are considerably slower. The present invention, on the other hand, provides access speeds in and above the nanosecond range by virtue of a unique geometrical arrangement of its optical elements, which avoids the complexities and speed limitations inherent in deflection mechanisms. Although certain types of optical memories, for example those employing a uniformly thin film as the memory medium, have very high packing densities; the time of access, however, to any random storage destination is relatively low.

On the other hand, storage means employing alterable media such as photochromic, magnetooptic, or electro-optic materials suffer from the disadvantage that packing densities are relatively low.

OBJECTS

Accordingly, it is the principal object of the invention to provide high capacity low cost storage with extremely high speed access in and above the nanosecond range.

A further object is to provide a high volume storage with high speed access which is simpler in operation and more economical than present day high capacity storage means.

Yet another object is to provide a high volume holographic storage with access in the time domain which is faster than existing storage facilities.

A more detailed object is to provide a holographic storage with high volumetric efficiency having a unique arrangement of optical elements that avoids the complexities and speed limitations associated with conventional beam deflectors and costly scanlasers.

The foregoing and other objects, features and advantages of the invention will be apparent from the following more particular description of preferred embodiments of the invention, as illustrated in the accompanying drawings.

DESCRIPTION OF THE EMBODIMENTS

Figure 1:
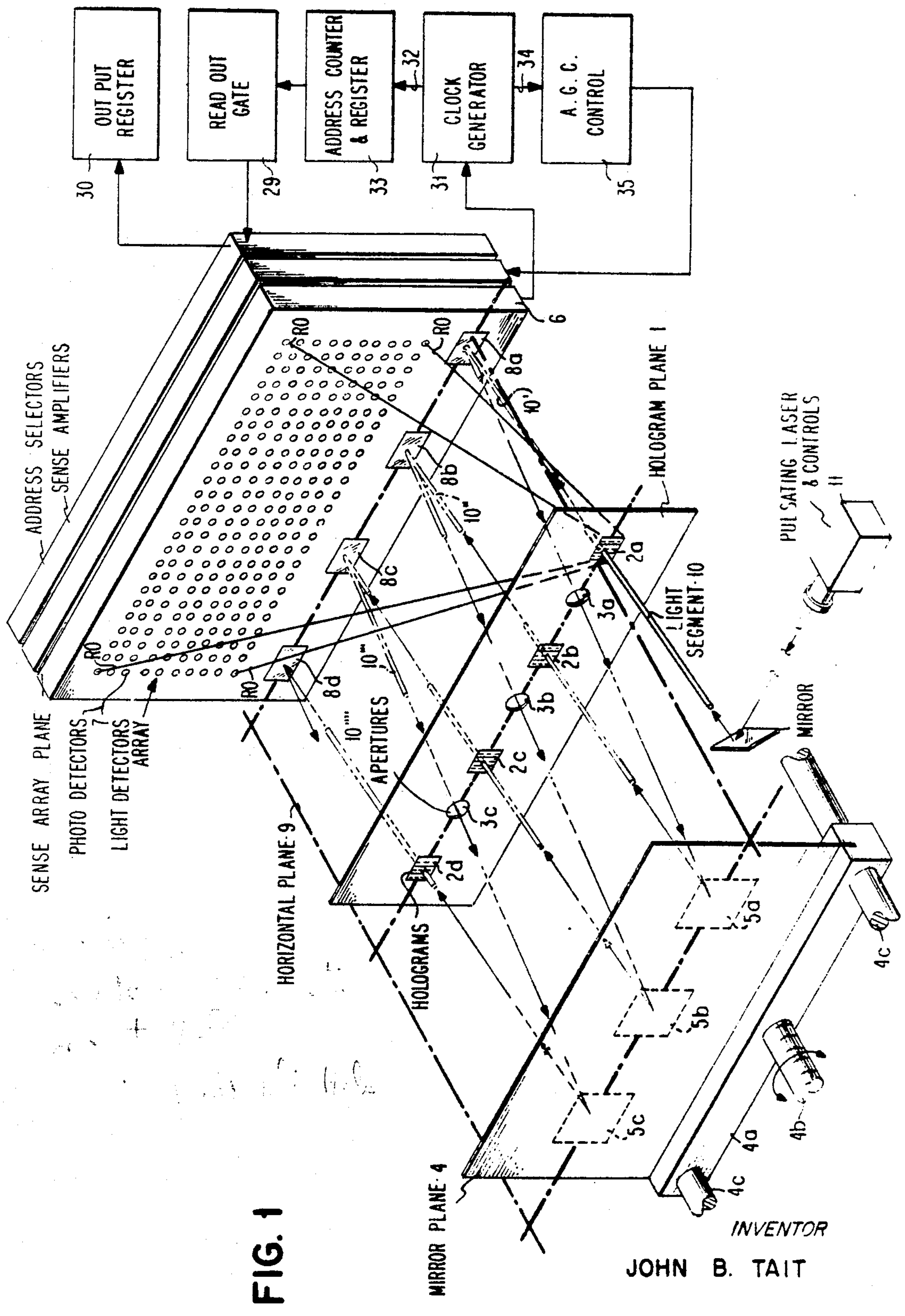
FIG. 1 shows an embodiment of the invention having a single sense array responsive to the information patterns read out from a plurality of holograms under control of a single segment of coherent radiation.

In the embodiment shown in FIG. 1, a hologram plane 1, comprised of a rigid flat member, supports a plurality of spaced apart holograms 2*a* through 2*d* of the transmission type. Intermediate said holograms are apertures 3*a*, 3*b*, 3*c* through which a light segment passes in a manner to be explained hereinafter. A mirror plane 4 located to the left of said hologram plane 1, is also comprised of a rigid flat member and supports a plurality of spaced apart mirrors 5*a*, 5*b*, 5*c*. Situated on the right side of said hologram plane 1 is a sensing array 6 comprised of a matrix of light sensitive detectors 7. Below the bottom line of detectors is an array of spaced apart mirrors 8*a*, 8*b*, 8*c*, 8*d*. The mirrors 5, 8 are arranged such that their centers lie in a horizontal plane 9 that further passes through the centers of the apertures 3 and the holograms 2. By virtue of this arrangement a segment of light 10 issued from a pulsating light source 11 enters the first hologram 2*a* and follows a reflecting path that exits from the last mirror 8*d*. In traversing this path, the beam segment 10 passes through the first hologram 2*a* and causes a coded information pattern contained therein to be read out onto the detectors 7 in sense array 6. The zero order 10′ of the segment 10 impinges on mirror 8*a* and upon reflection passes through aperture 3*a*, is reflected from mirror 5*a* and passes through the second hologram 2*b* from which a coded information pattern is read out onto the detectors in sense array 6. The zero order beam 10″ issuing from the hologram 2*b* is reflected by mirror 8*b*, passes through the aperture 3*b* and reflected by mirror 5*b* to pass through the third hologram 2*c* from which a coded information pattern is read out onto the detectors in the sense array 6. The zero order beam 10‴ is reflected by mirror 8*c*, passes through aperture 3*c*, is reflected by mirror 5*c* and directed through the last hologram 2*d* which issues its coded information pattern onto the sense array 6; and the zero order 10⁗ is reflected by the mirror 8*d* and passes off into space or is dissipated by suitable means not shown. To avoid confusion in FIG. 1, only a single readout beam is shown emanating from the hologram 2*a*, this being schematically depicted by four lines referenced $R_o$.

Admittedly, different types of holograms have different efficiencies. The present invention utilizes holograms having relatively low efficiencies and are arranged in increasing efficiency from .01% to 4%. The zero order beams are reduced in power by a relatively small amount at each hologram but insufficient to bring the power of the last zero order beam 10‴ below the tolerance limits of the detectors 7 in the sense array 6. The pulse laser source is operated to provide a sufficiently high peak power pulse, for example 10–100 watts, to compensate for the loss accumulated in passing through all holograms. Although the outputs from the detectors may vary under these circumstances, appropriate automatic gain control sense amplifiers are utilized to raise the outputs of the signals issued by the detectors. The amplifiers, in turn, are further interconnected to address selectors whereby access to any desired group of the pattern signals may be realized.

In order to vary the beam segment transit time, the position of the mirror plane 4 relative to the hologram plane 1 may be adjusted. This is achieved by an arrangement including a support means 4a, supporting the mirror plane 4, that is adapted to be moved in either a forward or backward position relative to the plane 1 by means of a screw assembly 4b and a pair of slide rods 4c on which the support means 4a is slidable. By virtue of this arrangement, the beam segment transit time may either be advanced or delayed by any desired time interval.

Figure 2:
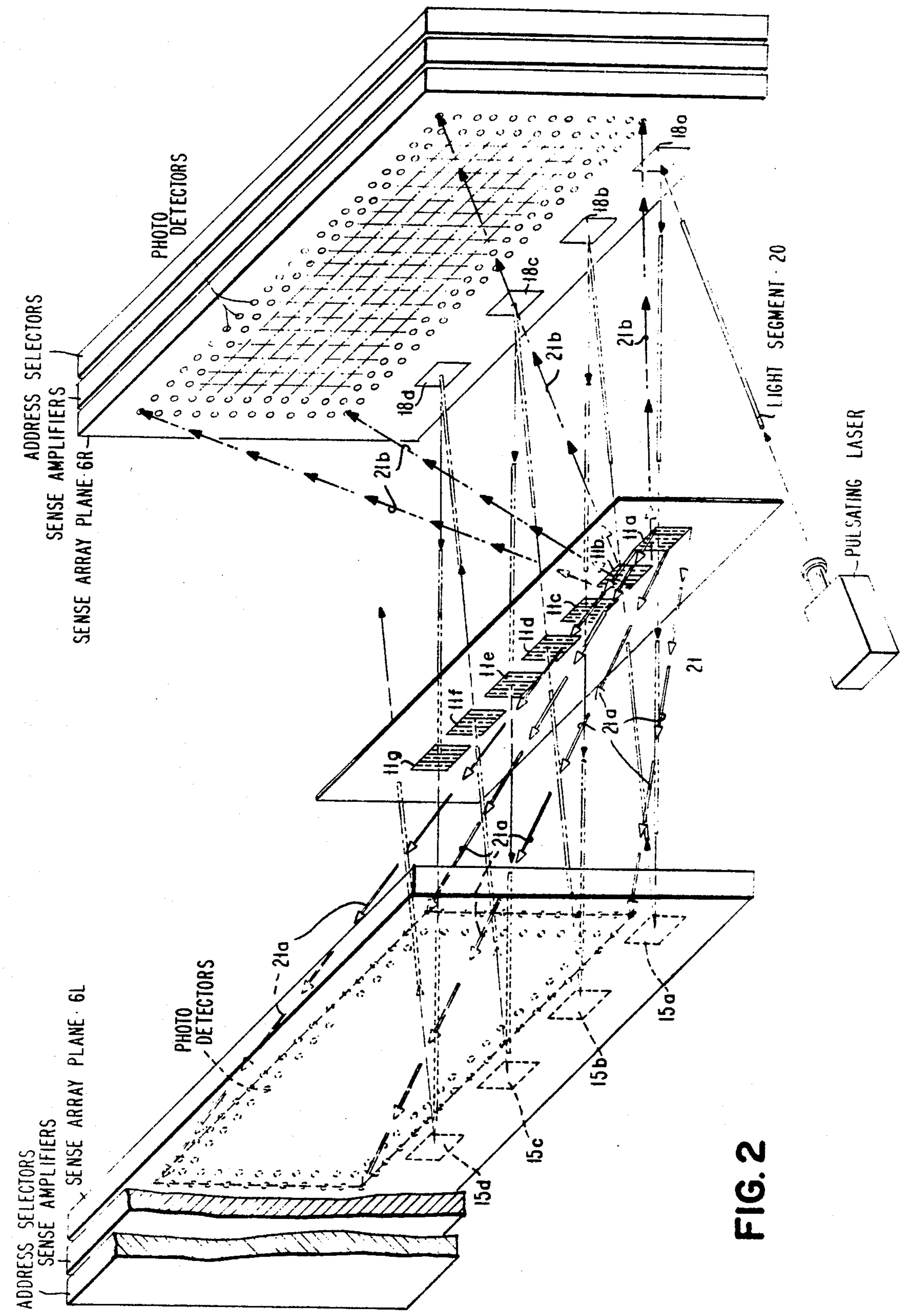
FIG. 2 is a modification of the embodiment shown in FIG. 1, but having a pair of sense arrays.

The arrangement shown in FIG. 2 employs a hologram plane 1', containing holograms 11a through 11g, situated between a pair of sense array planes 6R and 6L, each plane identical to the plane 6 shown in FIG. 1. The arrays 6R and 6L support mirrors 18a through 18d, and mirrors 15a through 15d, respectively, that are spaced from each other in such a manner as to provide a reflecting path along which beam segment 20 passes sequentially through all holograms 11a through 11g to cause a serial readout, in the time domain, of the coded information recorded in these holograms. In traversing the hologram plane the beam segment causes readout to the sense array 6L from holograms 11a, 11c, 11e and 11g, whereas the readout to the array 6R is from holograms 11b, 11d and 11f, the direction of readout being indicated by the arrows 21a, 21b extending respectively from holograms 11a and 11b. In this arrangement the sense arrays 6R, 6L are each provided with an array of photodetectors responsive to the coded information patterns read out from the holograms. Each sense array provides electrical output signals corresponding to the coded information patterns. These output signals are further amplified by sense amplifiers in turn interconnected to address selectors, well known in the computer art, to provide access to any desired pattern or group of amplified electrical signals.

It may be appreciated that a delay scheme may be implemented in the arrangement of FIG. 2, similar to that employed in FIG. 1. The delay arrangement may be applied to position either array plane 6L, 6R or the hologram plane 1', or to any desired combination of these planes, to vary the transit time of the beam segment through the holograms in the hologram plane. To provide further flexibility in the delay scheme, the mirrors 15, 18 may be disposed on movable planes separate from the sense array planes which would assume a fixed position in the arrangement of FIG. 2.

The readout at the sense array is a succession of parallel information blocks representing the information in the successive holograms. Each block of information appears in succession in time and is selected by normal address coincidence gating of the desired portion from the sense array to an output register 30 under control of a readout gate 29 that is controlled by an address counter and register 33 in the following manner. The sensing of information at the sense array is used to advance a clock generator 31 that issues a clock signal, via line 32, to advance a hologram address counter 33 for selection purposes and also provides a position sensing signal, along line 34, to vary automatic gain control means 35 to control the sense amplifiers in accordance with the hologram being read. Minimum gain is made available for the first hologram with successively higher gain applied for each successive hologram read. This AGC compensates for the loss in energy in the beam segment as it progresses through the system. The total cycle time of the system is equal to the transit time required of the light beam segment 10 to pass through the series of holograms, and the next beam segment is applied immediately following readout from the last hologram by the current beam segment.

The concept of the invention as disclosed in FIGS. 1 and 2 may be further extended to include a plurality of separated stacked planes by appropriate rearrangement of mirrors and the sense arrays so as to direct the beam segment along reflected paths extending in each of said planes.

The invention may further be modified to include additional spaced apart hologram planes in the path of said segment of radiation.

To counteract the noise produced by successive passage of the zero order beam segment through successive holograms, a spatial filter may be placed in proximity to each hologram.

Although the generation and selection of sub-nanosecond pulses has been achieved by those skilled in the laser art, a technique has been demonstrated for the selection of a single picosecond pulse from a train of such pulses. The technique is disclosed in the Applied Physics Letters, vol. 10, No. 1, dated Jan. 1, 1967. Beginning on page 16 of this paper, J. A. Armstrong of the IBM Watson Research Center found that the pulses measured have a full width at half power of between 4 and 6 picoseconds, and the technique is further capable of measuring pulse widths at least as short as $4\times10^{-13}$ sec. Although detectors employed by the present invention do not have response characteristics in this range, they, however, are capable of responding to light segments in the nanosecond range. However, as techniques improve for producing detectors with higher response characteristics, the latter may be readily accommodated by the present invention to attain speeds of operation in the picosecond range.

For fast response and operation, integrated arrays of photosensors and read amplifiers are utilized in the sense arrays. The selection matrix for readout of the bit amplifiers is also an integrated planar assembly in the sense array. The use of the integrated amplifier, in either linear or flip-flop mode, for each bit in the array, provides the sensitivity and speed of response. The flip-flop mode merely requires the photosensor to trip the flip-flop to the "on" state and requires very low energy to operate. A typical PIN type diode with a sensitivity of 0.35 $\mu$a./$\mu$w. at 6328 A. would produce a signal of 640 microvolts across 200 ohms with an incident radiation of 9.5 microwatts. The 640 microvolt signal would be the trigger signal for the flip-flop mode or the signal amplified by the linear amplifier in the linear mode. The flip-flop or amplifier in either case is a part of the integrated array and produced by additional artwork on the silicon substrate. At 10$\mu$ watts per bit and 4% diffraction efficiency, the energy for readout is 250 microwatts per bit. Assuming 50% losses for conservative design allowance, the energy from a 10 watt pulse from a pulsed laser will produce the energy to read an array of 20,000 bits.

As an example, but by no means a limitation, a system operating with a one nanosecond light pulse and 10 hologram positions would have a light path length from the first hologram to the mirrors and to the next hologram of 150 centimeters for a read out time allowance of 6 nanoseconds. A one nanosecond segment of light (30 centimeters) progressing through the structure shown in FIG. 1 would have a hologram plane 1 to sense array 6 distance of 30 cm. and a hologram plane 1 to mirror plane 4 distance of 60 centimeters. This allows the readout selectors to gate the selected information to the output register at the 6 nanosecond repetition rate from hologram to hologram. With 10 holograms the next light pulse would be spaced 60 nanoseconds after the previous pulse to allow the earlier pulse to exit from the last (10) hologram.

In summary, the invention provides a new basic system of "beam deflection" using time rather than spatial positioning on the $x$–$y$ plane for selection of a hologram for reading. The relative motion between laser beam and the medium (hologram) is differentiated and addressed in the time domain. Since all holograms are positioned to read out to the same, or an arrangement of arrays, the readout signals all overlap in spatial position. In order to be read individually, the use of a pulse, or discrete segment, of coherent light and its time of arrival provides the selection. All other methods require the deflection of the beam from its rest position by active means such as polarization splitters, total internal reflection prisms, or moving mirrors. The speed is the highest available with the least power since no active deflection energy is required.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A holographic storage system in which information stored in a plurality of holograms is retrieved through a time multiplexed detector, comprising:

a plurality of spaced apart information bearing holograms mounted in a first plane;

a source for generating a defined segment of coherent radiation, said defined segment of coherent radiation being directed to a first hologram in said plurality of information bearing holograms on said first plane;

a first plurality of reflecting means mounted in a second plane for reflecting undiffracted light from said plurality of information bearing holograms;

a second plurality of reflecting means, mounted in a third plane for reflecting undiffracted radiation from said plurality of information bearing holograms;

said first plane being interposed between said second and third planes;

radiation detecting means mounted in said second plane for detecting information bearing radiation from each of said plurality of information bearing holograms in a sequence determined by the placement of each of said plurality of information bearing holograms, the spacing between said second and third planes, and the transit time of radiation in the medium between said first, second and third planes;

wherein said defined segment of coherent radiation is directed through said first hologram in said first plane causing information bearing radiation to be directed to said detecting means, undiffracted coherent radiation passing through said first hologram being reflected by one of said plurality of reflecting means in said second plane which reflects said undiffracted coherent radiation to one of said plurality of reflecting means in said third plane, said first, second and third planes being spaced apart sufficient distance to enable said detecting means to detect information bearing radiation from one of said plurality of holograms and be reset to a condition to receive information bearing radiation from a next one of said holograms before said defined segment of coherent radiation arrives at said next hologram after being reflected by one or more of said plurality of reflecting means on each of said second and third planes.

2. A holographic storage system according to claim 1 further comprising means for adjusting the gain of said radiation detecting means to compensate for variation in radiation energy reaching said detecting means due to path and reflection energy losses.

3. A storage system as in claim 1 in which said hologram plane is provided with apertures interposed intermediate said holograms to enable portions of said reflecting path to pass therethrough unobstructed in one direction while the remaining portions of said path provide respective paths for said defined segment to pass through said holograms in an opposite direction during which said information is read out.

4. A system in claim 3 further including a delay control means for varying the positioning of one of said mirror planes so as to either lengthen or shorten said reflecting path.

5. A system as in claim 3 in which said information is in the form of coded patterns and means interconnected with said sense array to convert said coded information patterns into corresponding electrical signal patterns.

6. A system as in claim 1 further provided with a pair of sense arrays each supported one on each of said second and third planes and each is responsive to information read out in time sequence from alternate holograms during the passage therethrough of said defined segment.

7. A system as in claim 6 further including means interconnected with each of said sense arrays to provide electrical pattern signals corresponding to the information read out from said holograms.

References Cited

UNITED STATES PATENTS

| | | | |
|---|---|---|---|
| 3,403,261 | 9/1968 | Bowers et al. | 350—DIG 1 |
| 3,578,846 | 5/1971 | Chen | 350—162 SF |

OTHER REFERENCES

Tait et al. IBM Technical Disclosure Bulletin, vol. 11, No. 12, May 1969, p. 1636.

DAVID SCHONBERG, Primary Examiner
R. J. STERN, Assistant Examiner

U.S. Cl. X.R.

340—173 LT; 350—DIG 1